United States Patent
Greathouse et al.

(10) Patent No.: US 8,763,203 B2
(45) Date of Patent: Jul. 1, 2014

(54) TACKLESS CARPET STRIP

(71) Applicants: Glen P. Greathouse, Andalusia, AL (US); Michael H. McKenna, Andalusia, AL (US); Brian McKenna, Andalusia, AL (US)

(72) Inventors: Glen P. Greathouse, Andalusia, AL (US); Michael H. McKenna, Andalusia, AL (US); Brian McKenna, Andalusia, AL (US)

( * ) Notice: Subject to any disclaimer, the term of this patent is extended or adjusted under 35 U.S.C. 154(b) by 0 days.

(21) Appl. No.: 13/968,947

(22) Filed: Aug. 16, 2013

(65) Prior Publication Data

US 2014/0047671 A1 Feb. 20, 2014

Related U.S. Application Data

(60) Provisional application No. 61/683,974, filed on Aug. 16, 2012.

(51) Int. Cl.
*A47G 27/04* (2006.01)

(52) U.S. Cl.
CPC .......... *A47G 27/045* (2013.01); *A47G 27/4062* (2013.01)
USPC ............................................................ 16/16

(58) Field of Classification Search
USPC ....................................................... 16/4, 16
See application file for complete search history.

(56) References Cited

U.S. PATENT DOCUMENTS

| | | | | |
|---|---|---|---|---|
| 3,047,903 A * | 8/1962 | Reinhard | ........................... | 16/16 |
| 3,673,633 A | 7/1972 | Frebraro | | |
| 3,828,391 A | 8/1974 | Sutton et al. | | |
| 3,858,269 A * | 1/1975 | Sutton et al. | ....................... | 16/16 |
| 4,225,074 A * | 9/1980 | Jacobson | ........................... | 227/2 |
| 4,557,774 A * | 12/1985 | Hoopengardner | ............... | 156/71 |
| 4,853,067 A * | 8/1989 | Annas et al. | ................... | 156/351 |
| 4,970,754 A | 11/1990 | Anderson et al. | | |
| 5,304,268 A * | 4/1994 | Hoopengardner | ............... | 156/90 |
| 5,382,462 A * | 1/1995 | Pacione | ........................... | 428/95 |
| 6,155,629 A * | 12/2000 | Sherman | .................... | 296/97.23 |
| 6,216,315 B1 * | 4/2001 | Fuzzell | ........................... | 16/17.1 |
| 6,591,578 B2 | 7/2003 | McDonald | | |
| 6,662,518 B1 | 12/2003 | Devereux | | |
| 2002/0083553 A1 * | 7/2002 | Johnson | ........................... | 16/16 |

FOREIGN PATENT DOCUMENTS

| | | |
|---|---|---|
| RU | 2187953 C1 | 8/2002 |
| RU | 2266700 C2 | 12/2005 |
| WO | 90/10112 A1 | 9/1990 |

OTHER PUBLICATIONS

International Search Report and Written Opinion issued Jan. 16, 2014 in corresponding International Application No. PCT/US2013/055386 filed Aug. 16, 2013.

* cited by examiner

*Primary Examiner* — Jeffrey O Brien

(74) *Attorney, Agent, or Firm* — Angela Holt; Bradley Arant Hoult Cummings LLP

(57) ABSTRACT

A tackless carpet strip for affixing carpet to a hard surface has a flat base with spikes extending from the base at an angle. A lower surface of the base is coated with protective sealant. A foam adhesive tape strip has two adhesive surfaces; the first surface is permanently adhered to the lower surface of the base. The second adhesive surface is covered with a removable protective film.

17 Claims, 5 Drawing Sheets

TACKLESS CARPET STRIP

CROSS-REFERENCE TO RELATED APPLICATIONS

This application claims the benefit of U.S. Provisional Application No. 61/683,974 titled "Tackless Carpet Stripping," filed on Aug. 16, 2012, the entire contents of which are incorporated herein by reference.

BACKGROUND AND SUMMARY OF THE INVENTION

Traditional carpet tack strips for attaching carpet to a floor in a room are composed of strips of wood or other material that are nailed to the floor around the edges of a room. A typical carpet tack strip is approximately four feet in length, about an inch wide and about a quarter of an inch in thickness, with the bottom surface of the strip positioned on the floor and fastened to the floor with a plurality of nails driven through the strip and into the floor. A four-foot strip typically requires nine nails to secure the strip to the floor.

The upper surface of the carpet tack strip comprises a plurality of sharp-edged spikes that extend upwardly from the upper surface of the strip and project above it at an angle inclined with respect to the upper surface of the strip such that the spikes project toward an adjacent wall when installed. The carpet is secured to the spikes on one wall and stretched across and secured to the spikes on remaining walls.

A disadvantage of traditional carpet strips is the need for nails (tacks) to secure the strips into the floor. When floor is made of concrete, for example, installing the strips may present difficulties, however, because driving concrete nails into old concrete is sometimes impossible. Further, certain types of concrete flooring (e.g., Terrazzo) are so hard that they will not accept concrete nails, and the carpet installer must drill into it in order to affix strips.

One option for fastening carpet strips to concrete floors is to use an adhesive such as Chemrex® brand adhesive. The adhesive is applied to the strip and the strip is pressed onto the floor. While adhesive provides a good strong bond between the strip and the floor, the cure time—for some adhesives the time between adhesion of the strip to the floor and when the strip is ready for the carpet to be stretched—is at least two hours, and possibly more.

More recently, hot glue guns have been used to apply carpet strips to floors. However, these devices must be plugged into an electrical source, and also require some cure time.

The carpet strips of the present disclosure provide an advantage over the previous methods for attaching carpet strips to flooring, in that no nails or other fasteners are required to be driven into the floor. This is because the strips are affixed to the flooring using peel-and-stick tape that is adhered to the carpet strip and to the floor. Further, no cure time is required, and the carpet may be stretched immediately after the carpet strips are affixed to the floor.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

Figure 1:
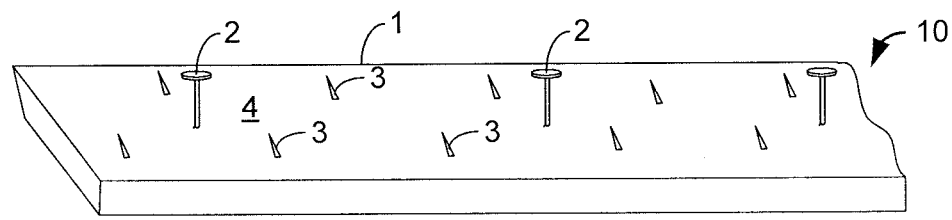
FIG. 1 is a perspective view of a prior art carpet strip.

FIG. 1 is a perspective view of a prior art carpet tack strip 10. The strip 10 comprises a strip base 1 that is formed from wood or other suitable material. The strip 10 has a top surface 4 from which a plurality of spikes 3 protrude upwardly at an angle. A plurality of tacks or nails 2 extend through the strip base 1 and are driveable into a floor (not shown) to secure the strip 10 to the floor. The spikes 3 angle toward a wall (not shown) against which the strip 10 is installed, and the spikes 3 anchor a carpet (not shown) that is installed on the floor and stretched from strip to strip.

Figure 2:
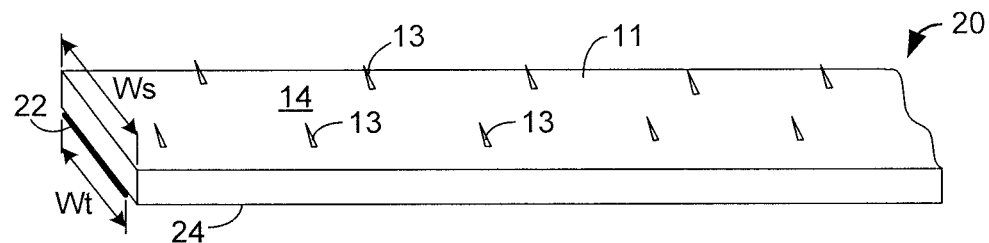
FIG. 2 is a perspective view of a carpet strip according to an embodiment of the present disclosure.

FIG. 2 is a perspective view off the tackless carpet strip 20 according to an embodiment of the present disclosure. The strip 20 comprises a strip base 11, which is formed from wood or other suitable material, such as plastic or aluminum. The strip 20 has a top surface 14 from which a plurality of spikes 13 protrude upwardly at an angle. No nails 2 (FIG. 1) are required to secure the strip 20 to the floor (not shown). Instead, tape 22 affixed to a lower surface 24 of the strip 20 adheres to the floor, as further discussed herein.

The strip 20 has a width "Ws" of around three-quarters of an inch (¾") to one inch wide in the illustrated embodiment. For some specialized applications in other embodiments, the strip 20 may be two (2) inches wide, for example. The tape 22 has a width "Wt" that is generally somewhat less than the width Ws of the strip 20. The tape 22 and the strip 20 are generally the same length, i.e., the tape 22 extends for the full length of the strip 20.

Figure 3:
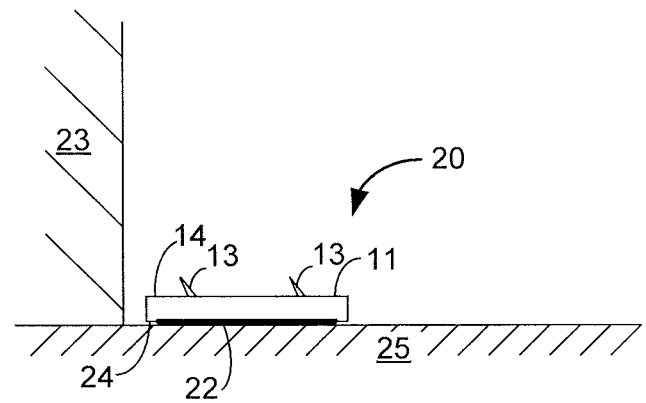
FIG. 3 is a side plan view of the carpet strip of FIG. 2, shown installed on a floor, before the carpet is installed.

FIG. 3 is a side view of the tackless carpet strip 20 installed on a floor 25 prior to installation of the carpet (not shown). The strip 20 is installed adjacent to, but not directly contacting, a wall 23. The spikes 13 extend upwardly from the top surface 14 of the strip 20 and angle toward the wall 23. Tape 22 is affixed to the lower surface 24 of the strip 20. In some embodiments, the tape 22 comprises polyethylene foam double-sided tape that is "pre-installed" on the strip 20 by a manufacturer, such that a user simply has to remove a protective covering (not shown) that covers the tape 22 on the lower side of the strip 20, before installing the strip 20 on the floor 25. In other embodiments, the user (not shown) installs the tape 22 to the strip 20 before installing the strip 20 to the floor 25.

In one embodiment, the tape 22 has a thickness of generally 1/32 inches, though tapes that are thicker could also be used. An important feature of the tape 22 is that it have sufficient thickness and resiliency to adhere well to irregular surfaces, because when installing carpet over concrete slabs, for example, the slab surface is not perfectly flat. Closed cell crosslinked polyethylene foam tape with a minimum thickness of about 1/32 inches and up to about 1/16 inches demonstrated the desired resiliency in tests performed. The tape 22 comprises adhesive on its top and bottom surfaces, and rubber adhesive is used in some embodiments.

Figure 4:
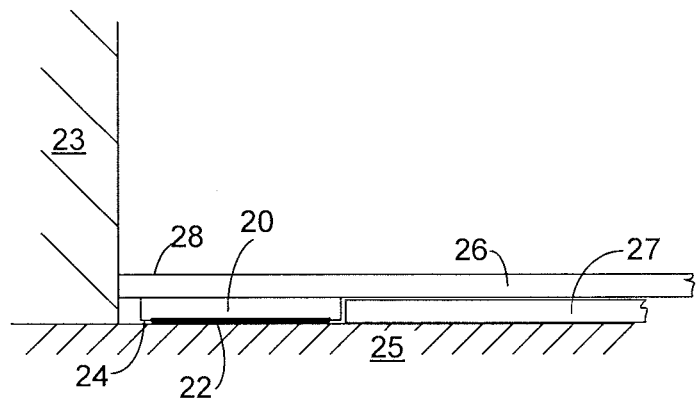
FIG. 4 is a side plan view of the carpet strip of FIG. 3, with the carpet installed.

FIG. 4 is a side view of the tackless carpet strip 20 of FIG. 3, after installation of a carpet 26. The carpet 26 is stretched across the floor 25 on top of a carpet pad 27. The carpet 26 is retained at its end 28 near the wall 23 by the spikes 13 (FIG. 3) which extend through the carpet 26 and secure the carpet 26 to the strip 20. The tape 22 is strong enough to maintain the strip 20 secured to the floor 25 even with the force of the carpet 26 acting on the strip 20.

Figure 5:
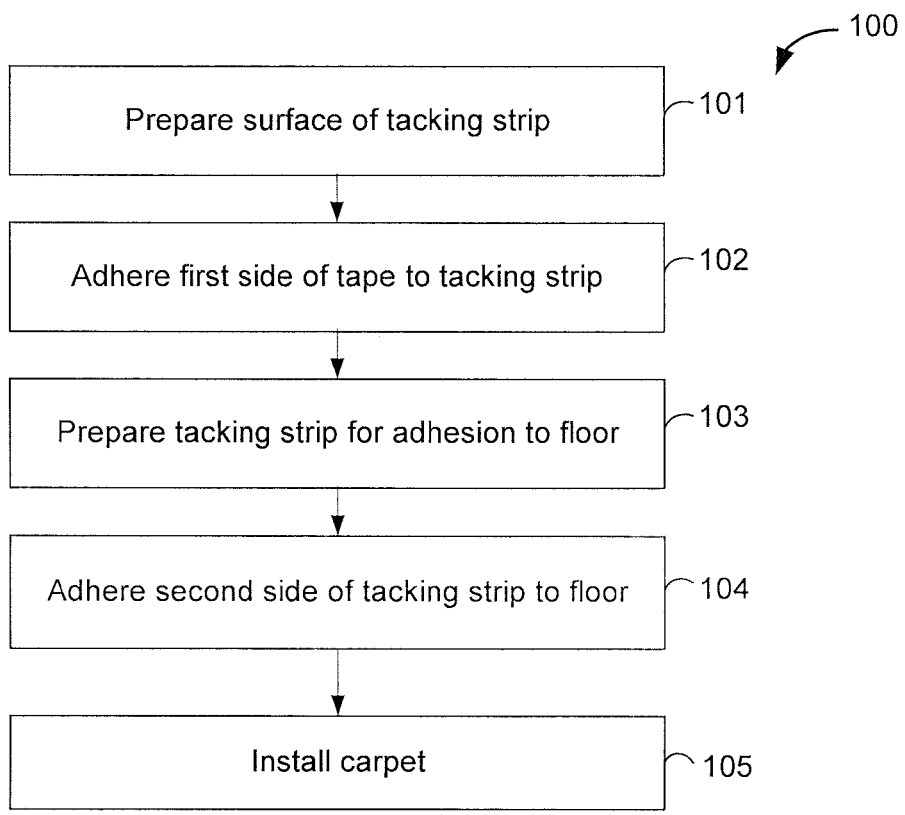
FIG. 5 depicts a method of installing carpet strips according to an embodiment of the present disclosure.

FIG. 5 illustrates the method 100 of installing the tackless carpet strip 20 (FIG. 3) to the floor 25 (FIG. 3). This method 100 presumes that the user has procured a strip 20 with spikes 12 already driven through it (e.g., a commercially available carpet strip, but without the nails).

In step 101 of the method 100, the user (not shown) prepares the lower surface 24 (FIG. 3) of the strip 20 to receive the tape 22. In order to achieve good adhesion of the tape 22 to the strip 20, the lower surface is sealed. In this regard, because the base 11 is typically formed from unsealed wood (e.g., plywood), a sealant is used to seal the pores of the wood and prevent the wood from drying out the adhesive in the tape and compromising the adherence of the strip 20 to the tape 22. Any of a number of sealants may be used for this purpose, and in one embodiment a clear lacquer sealant was employed. Primer paint or other sealants could be used, in the alternative.

After the sealant has dried, in step 102, the user adheres a first (top) adhesive side of the tape 22 to the strip 20 (not shown) from the first adhesive side of the tape 22 and pressing the first adhesive side of the tape 22 to the strip 20.

Steps 101 and 102 may be desired to be performed at a manufacturer's site, such that the strips 20 are shipped to the user with the tape 22 pre-installed on the strips, as further discussed herein.

In step 103, the user prepares the strip 20 for installation onto the floor 25 by cutting it to the desired length and removing the protective backing from a second (bottom) adhesive side of the tape 22. In step 104, the user affixes the strip 20 to the floor 25 by pressing it to the floor 25 in the desired location, adjacent to the wall 23. Pressing the strip 20 to the floor 25 causes the adhesive sides of the tapes to adhere to the floor 25 and the strip 20.

The floor 25 should be generally clean and as free as possible of dust before adhering the strip 20, in order to get the best possible adherence of the strip 20 to the floor 25. In some instances, the user may want to prepare the floor 25 for receiving the strip 20 by applying a solution of diluted liquid latex. In one example, the user applied a 5-1 solution of liquid latex and water by sprinkling the solution onto the floor 25 and wiping it with a cloth.

In step 105 of the method, the user installs the carpet 26 (FIG. 4) onto the floor 25 via the methods known in the art, securing the carpet 26 to the strip 20. No cure time is required between the installation of the strip 20 onto the floor 25 and the installation of the carpet 26, therefore the carpet 26 may be immediately installed.

In another embodiment of the disclosure, instead of a double-sided tape adhering the strip 20 to the floor 25, a pressure-sensitive adhesive (not shown) is employed. A rubber adhesive is used in one embodiment. This adhesive may be coated (i.e., painted) onto the lower surface 24 of the strip 20 and then the exposed lower surface is covered with a protective covering, such as wax paper or other suitable material. When the user is ready to install the strip 20, he removes the protective covering and adheres the strip to the floor as discussed above.

Figure 6:
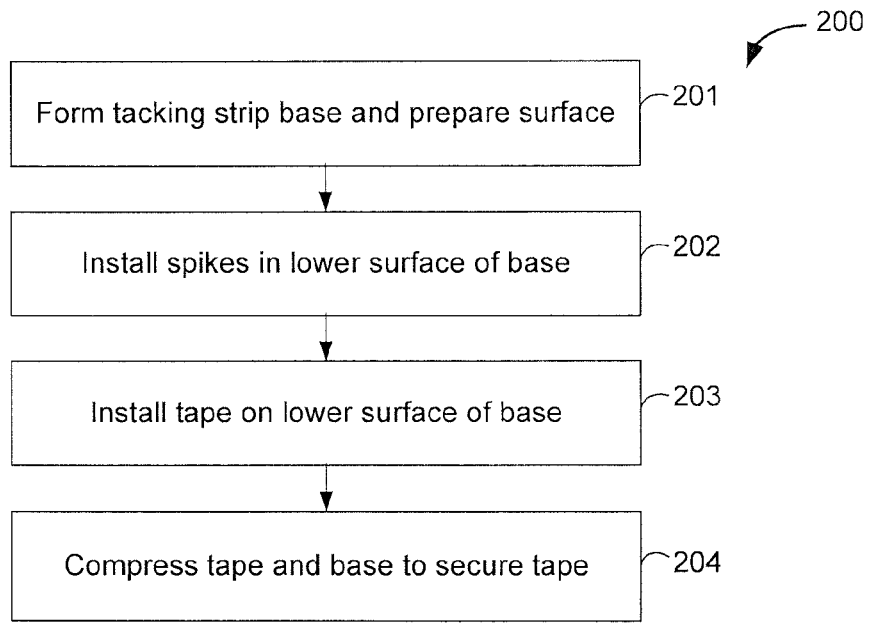
FIG. 6 depicts a method of manufacturing a tackless carpet strip according to an embodiment of the present disclosure.

FIG. 6 illustrates a method 200 of fabricating the tackless carpet strip 20 (FIG. 3). This method 200 generally presumes that the tape 22 is installed on to the carpet strip 20 at the manufacturer's location. In step 201 of the method 200, the strip base 11 is formed from a sheet (not shown) of material. Wood (e.g., plywood) is traditionally used for the strip base 11, though other materials, such as plastic or composite materials, could be used.

Figure 7:
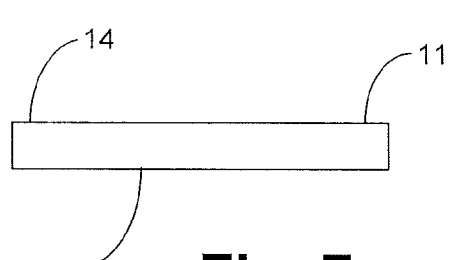
FIG. 7 depicts an end view of a strip base before spikes are installed into the base.

FIG. 7 depicts an end view of the strip base 11. The strip base 11 has a lower surface 24 that is generally flat and generally smooth. The lower surface 24 is prepared for adhesion of tape by sanding of the lower surface 24, followed by application of a seal primer. Any suitable primer for sealing surfaces of the type the strip base 11 is formed from (e.g., wood) may be used to prime the lower surface 24.

As discussed above, the strip base 11 is generally between 3/4" and 1" wide, because the finished strip 20 is desired to be this width. (Wider strips are used for some commercial carpet applications.) Although the illustrations show such generally narrow strips, in some embodiments, the strip 20 may be formed in large sheets before being cut into strips of this width. For example, in one embodiment, a large sheet of wood has spikes and tape applied before being cut into strips 20.

Figure 8:
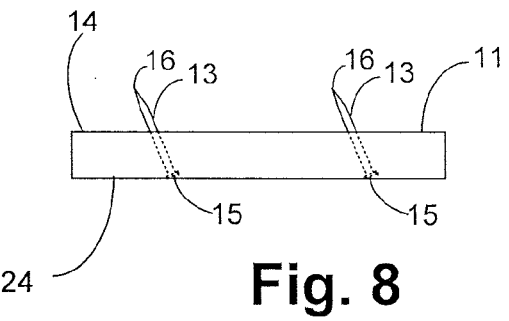
FIG. 8 depicts an end view of the strip base of FIG. 7 with spikes installed.

In step 202 of the method of FIG. 6, the spikes 13 are driven through the strip base 11. FIG. 8 depicts an end view of the strip base of step 202. A machine that is known in the art (not shown) may be used to drive multiple spikes 13 through the lower surface 24 at an angle, such that the tips 16 of the spikes 13 extend through the base 11 angularly, and the heads 15 of the spikes 13 are generally recessed into the lower surface 24.

Note that the preparation of the lower surface 24 by sanding and sealing may be delayed until after step 202 in other embodiments of the method 200.

Figure 9:
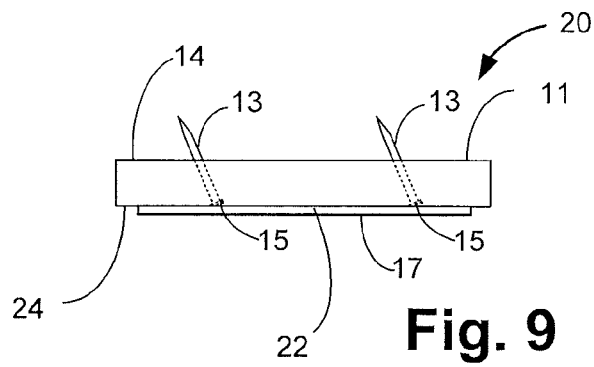
FIG. 9 depicts and end vide of the strip base of FIG. 7 with tape installed.

In step 203, illustrated in FIG. 9, the tape 22 is installed on the lower surface 24, over the spikes 13. i.e., the tape 22 generally covers the heads 15 of the spikes completely. The lower surface 17 of the tape 22 comprises a non-adhesive strip (not shown) that prevents the lower surface 17 of the tape 22 from sticking to surfaces until the non-adhesive strip is removed. Application of the tape 22 to the strip may be done by rolling the tape 22 onto the base 11. In this regard, the tape 22 may be supplied in large rolls (not shown), which may be unrolled onto the base 11.

In one embodiment, the tape 22 is not supplied in rolls and unrolled onto the base. Rather, the polyethylene foam that the tape 22 is formed from is sprayed onto the lower surface 24 and covered with a non-adhesive strip, e.g., wax paper. Before the foam is applied to the lower surface 24, a liquid adhesive is applied. Then after the foam is applied, a second layer of liquid adhesive is applied, to which the non-adhesive strip is releasably affixed. The foam (not shown) should be sufficiently thick to provide the desired resiliency, as discussed above. Foam thicknesses of 1/32 inch to 1/16 inch have been employed, and thicker foam layers are also possible.

In step 204, the base 11 and tape 22 are compressed to cause the tape 22 to adhere securely to the base 11 and form the strip 20. This compression step 204 is desirable to help remove air that may be between the tape 22 and the base 11. The step 204 may be performed using one of a number of methods. For example, the strip 20 could be laid upon a non-continuous surface (e.g., a grid or strips of supporting material) with the spikes oriented downward such that the spikes 13 extend through openings. And then a roller could be rolled over the tape 22 to compress the tape 22 to the base 11.

Figure 10:
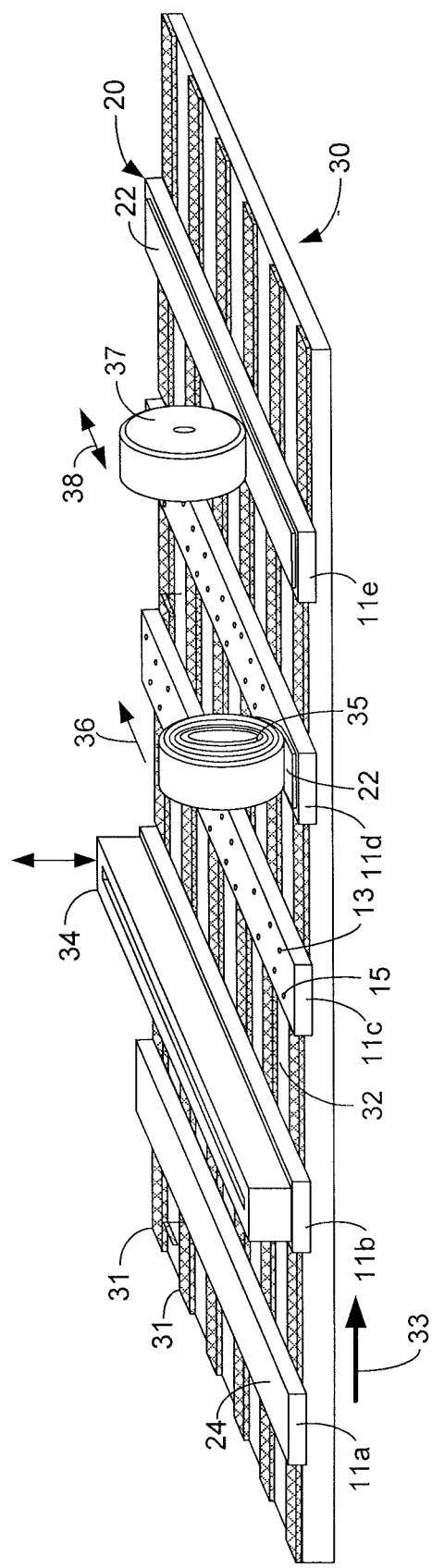
FIG. 10 depicts an embodiment of manufacture of the strips according to the present disclosure.

FIG. 10 depicts one possible embodiment for automating the manufacture of the strips 20 according to the method of FIG. 6. A conveyor line 30 comprises a plurality of supports 31 upon which the strips 20 are formed. The supports 31 are spaced apart from one another as illustrated. A plurality of bases 11a-11e are disposed on the supports 31, and the bases 11a-11e move in the direction indicated by directional arrow 33 along the conveyor line 30.

Base 11a illustrates the base which has been cut into a strip and has already had its lower surface 24 prepared by sealing. Note that the term "lower surface" is used for consistency with previous drawings, but the lower surface 24 is actually facing upwards in FIG. 10, because the bases 11a-11e are inverted on the conveyor line 30.

Base 11b is in the process of having spikes 13 installed. In this regard, a device 34 that is known in the art installs spikes through the base. Base 11c depicts the spikes 13 post-installation. The heads 15 of the spikes 13 are visible on the lower surface 24 of the base 11c. The spikes 13 are spaced apart such that the tips (not shown) extend into openings 32 between the supports 31.

Base 11d depicts a roll 35 of tape 22 being applied to the lower surface 24. The roll 35 is rolled in the direction shown by directional arrow 36, such that the majority of the lower surface 24 is covered with the tape 22.

Base 11e depicts a roller 37 rolling across the tape 22 to compress the tape 22 to the base 11e. The roller moves longitudinally along the base 11e as indicated by directional arrow 38. The roller 37 is heavy enough to induce a good adherence between the tape 22 and the base 11e.

Figure 11:
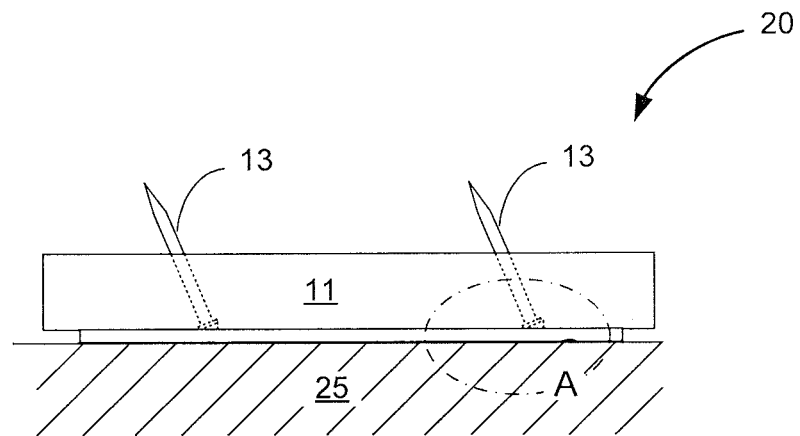
FIG. 11 is an enlarged end view of the carpet strip of FIG. 9, shown installed on a floor.

FIG. 11 is an enlarged end view of the carpet strip of FIG. 9, shown installed on the floor 25. Even when installing carpet on a generally smooth and flat concrete slab, the floor 25 is not perfectly smooth or flat, and oftentimes there are irregularities in the floor 25 surface.

Figure 12:
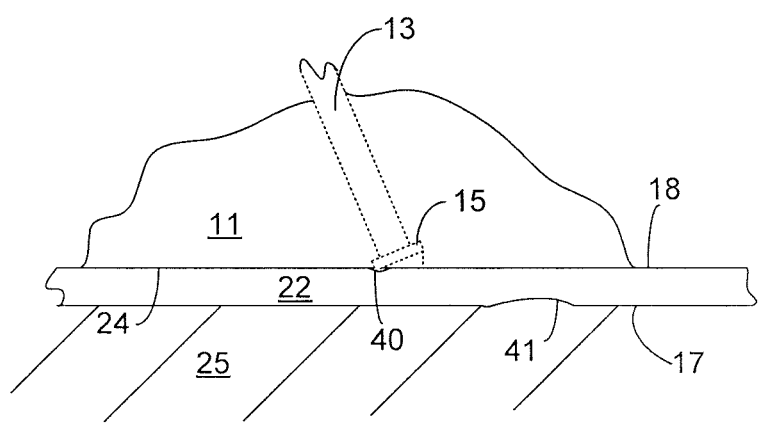
FIG. 12 is an enlarged detail view of the carpet strip of FIG. 11, taken along detail view "A" of FIG. 11.

FIG. 12 is an enlarged detail view of the carpet strip of FIG. 11, taken along detail view "A" of FIG. 11. Irregularity 41 is an exemplary protrusion in the floor 25. The resilient (i.e., spongy) nature of the tape 22, coupled with the thickness of the tape 22 causes it to conform to the irregularity 41. In this regard, the lower surface 17 of the tape 22 adheres to the irregularity 41.

Further, although the spikes 13 when installed in the base 11 are intended to be recessed into the lower surface 24 of the base, often the heads 15 of the spikes may protrude slightly from the lower surface 24, as illustrated by corner 40 of the head 15. The resilient nature and thickness of the tape 22 again causes it to conform to the extending corner 40 and generate a good seal between the upper surface 18 of the tape and the lower surface 24 of the base 11.

The invention claimed is:

1. A carpet strip, comprising:
   a flat base;
   a plurality of spikes extending through a lower surface of the base and protruding therefrom at an angle, the lower surface coated with a protective sealant;
   a resilient adhesive tape strip comprising two adhesive surfaces, the first adhesive surface permanently adhered to the lower surface of the base, the second adhesive surface covered with a removable protective film.

2. The carpet strip of claim 1, wherein the base is formed from wood.

3. The carpet strip of claim 1, wherein the base is formed from composite material.

4. The carpet strip of claim 1, wherein the base is formed from plastic.

5. The carpet strip of claim 1, wherein the base is formed from metal.

6. A method of manufacturing a carpet strip comprising the steps of:
   forming a thin base of material comprising an upper surface and a lower surface;
   sealing the lower surface of the base with a protective sealant;
   installing spikes in the lower surface of the base such that the spikes extend through the base and protrude therefrom at an angle;
   adhering double-sided adhesive tape to the lower surface of the base, the tape comprising a first and a second adhesive surface, the first adhesive surface adhered to the lower surface of the base, the second adhesive surface covered with a removable protective film;
   compressing the base and tape together to permanently affix the tape to the base.

7. The carpet strip of claim 6, wherein the forming the base of thin material step comprises forming the material into a strip.

8. The carpet strip of claim 6, further comprising the step of cutting the base into a plurality of individual strips.

9. The carpet strip of claim 6, wherein the first and second adhesive surfaces comprise rubber adhesive.

10. The carpet strip of claim 6, wherein the double-sided adhesive tape comprises closed cell crosslinked polyethylene foam.

11. The carpet strip of claim 10, wherein the tape is at least 1/32 inches thick.

12. A method of manufacturing a carpet strip comprising the steps of:
   forming a thin base of material comprising an upper surface and a lower surface;
   sealing the lower surface of the base with a protective sealant;
   installing spikes in the lower surface of the base such that the spikes extend through the base and protrude therefrom at an angle;
   applying a first adhesive layer to the lower surface of the base;
   applying a polyethylene foam layer to the first adhesive layer;
   applying a second adhesive layer to the polyethylene foam layer;
   applying a removable protective film to the polyethylene foam layer.

13. The carpet strip of claim 12, wherein the polyethylene foam layer comprises closed cell crosslinked polyethylene foam.

14. The carpet strip of claim 12, wherein the first and second adhesive layers comprise rubber adhesive.

15. The carpet strip of claim 12, wherein the foam layer is between 1/32 inches and 1/16 inches thick.

16. The carpet strip of claim 12, wherein the forming the base of thin material step comprises forming the material into a strip.

17. The carpet strip of claim 12, further comprising the step of cutting the base into a plurality of individual strips.

* * * * *